H. ELLIS.
Cotton Opener and Cleaner.

No. 210,930. Patented Dec. 17, 1878.

Witnesses:
W.B. Masson
W.E. Chaffee

Inventor:
Harvey Ellis
by E.E. Masson
atty.

N. PETERS, PHOTO-LITHOGRAPHER, WASHINGTON, D. C.

UNITED STATES PATENT OFFICE.

HARVEY ELLIS, OF WHITINSVILLE, MASSACHUSETTS.

IMPROVEMENT IN COTTON OPENERS AND CLEANERS.

Specification forming part of Letters Patent No. 210,930, dated December 17, 1878; application filed September 19, 1878.

*To all whom it may concern:*

Be it known that I, HARVEY ELLIS, of Whitinsville, in the county of Worcester and State of Massachusetts, have invented certain new and useful Improvements in Cotton Openers and Cleaners, of which the following is a full, clear, and exact description, reference being had to the accompanying drawings, making part of this specification, in which—

Figure 1:
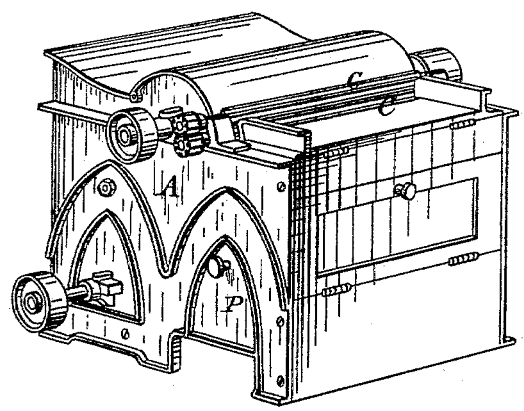
Figure 2:
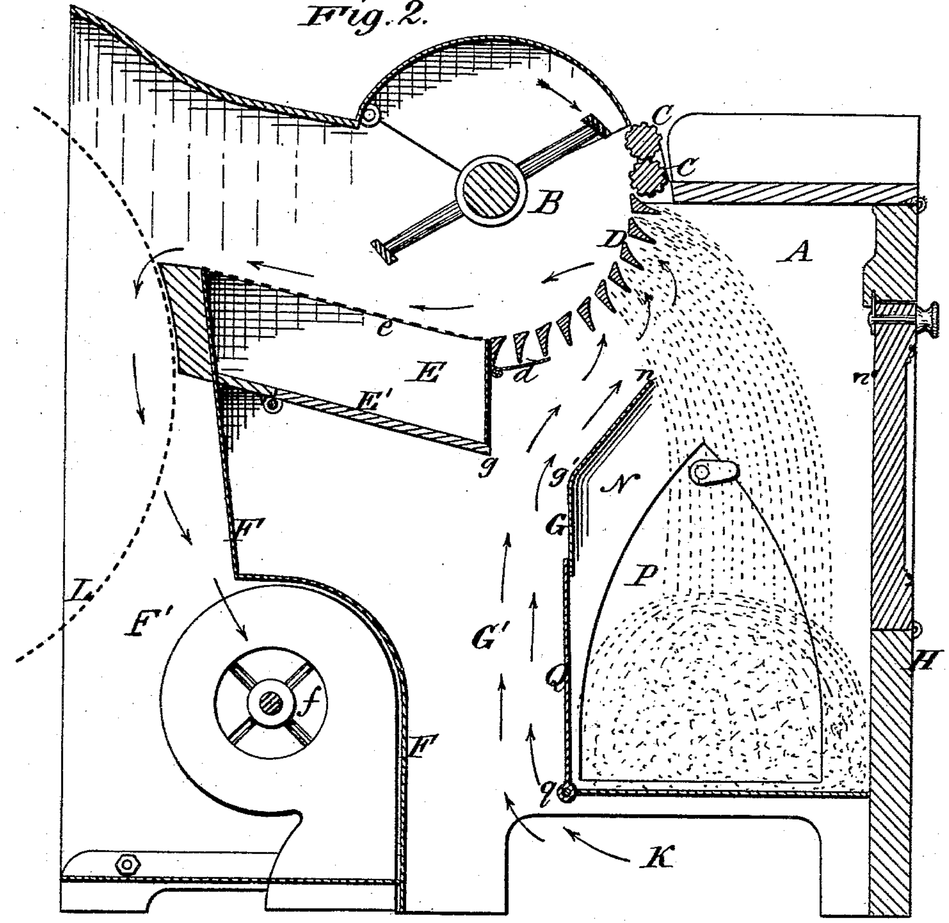

Figure 1 represents, in perspective, a portion of a three-beater lapper or picker containing my invention. Fig. 2 represents a longitudinal vertical section of the same.

This invention relates to a new arrangement of parts in machines for cleaning and forming laps of cotton, whereby the current of air admitted to the beater is conducted through a contracted passage, and is made to enter between the front grids or grate-bars, or the grate-bars nearest the feed end of the machine, where a quantity of good cotton is otherwise lost, being forced with the sand and leaves between the grids by the beaters; my object being to force it back to the beaters by the current of air brought through said passage, and to provide a still-air dust-box to receive the sand and other foreign matter.

My invention relates, also, to the combination of the beater and grids of a cotton opener and cleaner, and an air-passage inclined forward, with a still-air dust-box for the reception of sand and trashy matter separated from the cotton, said box having a free opening, (unencumbered by grating or screens,) the forward edge of which is substantially on a vertical plane passing through the feed-rolls, and the rear side is inclined to direct the current of air to the grids and beater.

In the drawings, A represents the frame or side of the picker; B, the beater; C C, the feed-rolls; D, the grid-bars under the front portion of the space occupied by the beater; E, a dust-box, having a wire-netting, *e*, in continuation of the grids, and a hinged bottom, E′. The space under the beater is divided into two chambers and a passage by the partitions F G H, extending across the picker. The chamber F′ contains the suction-fans *f*, by which air is drawn from the outside of the machine through the openings K in the sides, and follows the course indicated by the arrows in the passage G′ to and through the grids D, and from there to the wire cylinder or revolving screen, (shown by the dotted line at L,) where the cotton is deposited, and the air passes through the meshes to the suction-fans *f*.

The passage G′ is contracted at *g g′*, between the dust-box E and the partition G, and under the grids D, to confine the air-current, and thus increase its velocity as it approaches the beater.

One or more of the air-passages between the grid-bars adjoining the dust-box E may be closed by a plate, *d*, to concentrate the current of air close to the feed-rolls, according to the state of the atmosphere and the condition of the cotton.

When the dust, sand, leaves, &c., have been expelled by the beater, it is important that they should immediately be received and collected in a still-air box or chamber free of currents of air, and not be disseminated to vitiate the air of the room. For this purpose I have provided the still-air box or chamber N between the partitions G and H. Its opening *n n′* is free of screens, and is in front of the grids, its rear edge, *n*, being substantially or about in a vertical plane passing through the feed-rolls or the forward grids. It is provided with doors P, closing openings at each end, through which it can be emptied. It is also provided with a door, Q, hinged to the bottom at *q* to be swung open against the partition F when it is desired to empty the dust-box E by opening its bottom E′.

As regards the form of the grids which are used in my machine in connection with the devices specified, they are made so as to have three sides, one of which is straight and at right angle, or nearly so, to the other straight side, and the front side is made concave, to produce a prominent edge on the upper side of each, adjoining the beater, and to direct by a continuous circular course the dust, &c., from the beater to the still-air box, and at the same time form an edge at the rear side (farthest from the beater) for the free admission of the current of air returning escaping fibers of cotton to the beater.

Having now fully described my invention, I claim—

1. In combination with the beater and grids of a cotton opener and cleaner, and an air-passage inclined forward, admitting a current of air under and through the grids, the still-air dust-box N, having a free opening, the rear edge, *n*, of which is in a vertical plane, or nearly so, passing through the feed-rolls, and located to operate substantially as shown and described.

2. In combination with the grids and still-air dust-box of a cotton opener and cleaner, constructed substantially as described, the air-passage K G′, contracted at *g g*′, and inclined forward under the grids, substantially as and for the purpose set forth.

HARVEY ELLIS.

Witnesses:
H. A. GOODELL,
A. R. WRIGHT,
H. A. HAPGOOD.